United States Patent [19]

Yoshida et al.

[11] Patent Number: 6,075,878
[45] Date of Patent: Jun. 13, 2000

[54] METHOD FOR DETERMINING AN OPTIMALLY WEIGHTED WAVELET TRANSFORM BASED ON SUPERVISED TRAINING FOR DETECTION OF MICROCALCIFICATIONS IN DIGITAL MAMMOGRAMS

[75] Inventors: Hiroyuki Yoshida, Chicago, Ill.; Wei Zhang, Mountain View, Calif.; Robert M. Nishikawa, Batavia; Kunio Doi, Willowbrook, both of Ill.

[73] Assignee: Arch Development Corporation, Chicago, Ill.

[21] Appl. No.: 08/979,623

[22] Filed: Nov. 28, 1997

[51] Int. Cl.$^7$ ...................................................... G06K 9/00
[52] U.S. Cl. ............................ 382/132; 378/37; 382/248
[58] Field of Search .................................... 382/132, 248, 382/232; 378/37; 128/922

[56] References Cited

U.S. PATENT DOCUMENTS

| 5,513,273 | 4/1996 | Ito | 382/132 |
| 5,598,481 | 1/1997 | Nishikawa et al. | 382/132 |
| 5,717,791 | 2/1998 | Labaere et al. | 382/132 |
| 5,799,100 | 8/1998 | Clarke et al. | 382/132 |
| 5,825,936 | 10/1998 | Clarke et al. | 382/132 |
| 5,987,094 | 11/1999 | Clarke et al. | 382/132 |

OTHER PUBLICATIONS

Laine et al. "Mammographic Feature Enhancement by Multiscale Analysis." IEEE Transactions on Medical Imaging, vol. 13, No. 4, pp. 725–740, Dec. 1994.

Strickland et al. "Wavelet Transforms for Detecting Microcalcifications in Mammograms." IEEE Transactions on Medical Imaging, vol. 15, No. 2, pp. 218–229, Apr. 1996.

Zheng, et al. "Digital Mammograph: Mixed Feature Neural Network with Spectral Entropy Decision for Detection of Microcalcifications." IEEE Transactions on Medical Imaging, vol. 15, No. 5, pp. 589–597, Oct. 1996.

Yoshida et al. "Optimally Weighted Wavelet Packets for Detection of Clustered Microcalcifications in Digital Mammograms," Proceedings of 3$^{rd}$ Int. Workshop on Digital Mammography, pp. 317–322, Jun. 1996.

Aghdasi, "Application of Neural Network Adaptive Wavelets for Signal Representation and Classification in Digital Mammography," Proceedings of 3$^{rd}$ Int. Workshop on Digital Mammography, pp. 307–310, Jun. 1996.

*Primary Examiner*—Jon Chang
*Attorney, Agent, or Firm*—Oblon, Spivak, McClelland, Maier & Neustadt, P.C.

[57] ABSTRACT

A computer-aided diagnosis (CAD) method for detection of clustered microcalcifications in digital mammograms based on an image reconstruction using a substantially optimally weighted wavelet transform. Weights at individual scales of the wavelet transform are optimized based on a supervised learning method. In the learning method, an error function represents a difference between a desired output and a reconstructed image obtained from weighted wavelet coefficients of the wavelet transform for a given mammogram. The error function is then minimized by modifying the weights by means of a conjugate gradient algorithm. Performance of the optimally weighted wavelets was evaluated by means of receiver-operating characteristic (ROC) analysis which indicated that the present invention outperformed both a difference-image technique and partial reconstruction method currently used in CAD methods.

12 Claims, 7 Drawing Sheets

METHOD FOR DETERMINING AN OPTIMALLY WEIGHTED WAVELET TRANSFORM BASED ON SUPERVISED TRAINING FOR DETECTION OF MICROCALCIFICATIONS IN DIGITAL MAMMOGRAMS

The present invention was made in part with support from U.S. Government grant numbers USPHS CA 24806, and CA 60187, and The Whitaker Foundation. The U.S. Government has certain rights in the invention.

BACKGROUND OF THE INVENTION

1. Field of the Invention

This invention relates to determining optimal weighting coefficients for a wavelet transform. The invention also is related to a supervised training method to determine the optimal weighting coefficients. The invention further is related to the application of an optimally weighted wavelet transform for detection of microcalcifications in digital mammograms.

The present invention also relates to CAD techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; as well as U.S. application Ser. Nos. 08/158,388; 08/173,935; 08/220,917; 08/398,307; 08/428,867; 08/523,210; 08/536,149; 08/536,450; 08/515,798; 08/562,188; 08/562,087; 08/757,611; 08/758,438; 08/900,191; 08/900,361; 08/900,362; 08/900,188; 08/900,192; 08/900,189; and 08/979,639, each of which are incorporated herein by reference in their entirety.

The present invention also relates to technologies referenced and described in the references identified in the appended APPENDIX and cross-referenced throughout the specification be reference to the number, in brackets, of the respective reference listed in the APPENDIX, the entire contents of which, including the related patents and applications listed above and references listed in the APPENDIX, are incorporated herein by reference.

2. Discussion of the Background

Currently, breast cancer is a major cause of death of women in the United States. Clustered microcalcifications are an important indication of early breast cancer because they are present in 30–50% of all cancers found using mammography.

However, despite the above cited methods and improvements, 10–30% of women who have breast cancer and undergo mammography have negative mammograms [12]. In about two-thirds of these missed cases, the radiologist failed to detect a cancer that was evident retrospectively.

To give radiologists a "second opinion" for detection of clustered microcalcifications in mammograms, a computer-aided diagnosis (CAD) scheme based on filtering and feature extraction techniques [3–6] has been proposed. The CAD scheme identifies regions of potential clustered microcalcifications, which are indicated by a marker on the digitized images for review by radiologists.

Many investigators have developed various techniques for the automated detection of microcalcifications. Chan et al. [3,4] reported the efficacy of using a specialized preprocessing step known as the difference-image technique, which is followed by some feature analyses for detection of microcalcifications. Nishikawa et al. [5,6] extended this technique to include additional features such as size and contrast of microcalcifications. Lo et al., [7] Wu et al., [8] and Zhang et al. [9] used artificial neural networks to extract microcalcifications from image data. Other groups have reported applying statistical methods such as Bayesian decision theory [10] to the detection of microcalcifications based on extracted image features such as contrast, shape, and edge ingredients.

Briefly, the wavelet transform is a tool for decomposing images into various scale (size) components. In order to extract and examine the small-scale structures contained in an original image, the wavelet transform uses a fine "probe" that is represented by a small wave. By performing a convolution operation between the small wave and the image, one can extract small structures that have a high correlation with the small wave. The same extraction process can be applied to large-scale structures. In this case, a large (or dilated) wave is used for extraction of large structures.

Let $\psi(x)$ be a one-dimensional orthogonal wavelet, referred to as a mother wavelet, on the real line IR, and let $\phi(x)$ be the corresponding scaling function, as constructed by Daubechies [17]. The wavelet $\psi_k^j(x)$ and the scaling function $\phi_k^j(x)$ at scale j and translation k are defined by dilation and translation of the mother wavelet $\psi(x)$ and the scaling function $\phi(x)$ as follows:

$$\psi_k^j(x) = \psi(x/2^j - k)/\sqrt{2^j},$$

$$\phi_k^j(x) = \phi(x/2^j - k)/\sqrt{2^j}.$$

The separable, two-dimensional wavelet basis $$\{\Psi_{k_1,k_2}^{j,\lambda}(x, y)\}$$

on the real plane IR [2] is defined by tensor products of the one-dimensional wavelets $\psi_k^j(x)$ and the scaling function $\phi_k^j(x)$ as shown below [17]:

$$\Psi_{k_1,k_2}^{j,h}(x, y) = \phi_{k_1}^j(x)\psi_{k_2}^j(y),$$

$$\Psi_{k_1,k_2}^{j,v}(x, y) = \psi_{k_1}^j(x)\phi_{k_2}^j(y),$$

$$\Psi_{k_1,k_2}^{j,d}(x, y) = \psi_{k_1}^j(x)\psi_{k_2}^j(y).$$

Here, the superscripts h, v, and d indicate that the corresponding wavelets are horizontal, vertical, and diagonal wavelets. The subscripts $k_1$ and $k_2$ indicate translations along the x and y directions, respectively.

Then the two-dimensional wavelet transform of an input image $I(x,y) \in L^2(IR^2)$, which is represented as a gray-scale image on a Cartesian coordinate $(x,y) \in IR^2$, is given by:

$$I(x, y) = \sum_{j=1}^{L} \Psi^j(x, y) + mean(I), \qquad (1)$$

$$\Psi^j(x, y) \equiv \sum_{\lambda=h,v,d} \sum_{k_1=0}^{2^{L-j}-1} \sum_{k_2=0}^{2^{L-j}-1} c_{k_1,k_2}^{j,\lambda} \cdot \Psi_{k_1,k_2}^{j,\lambda}(x, y) \qquad (2)$$

-continued $$c_{k_1,k_2}^{j,\lambda} \equiv \int I(x,y)\Psi_{k_1,k_2}^{j,\lambda}(x,y)dx. \quad (3)$$

Here, L represents the maximum scale of the wavelet decomposition that is equal to $\log_2 S$, with S being the size of the image $I(x,y)$, and mean(I) represents the mean value of the image $I(x,y)$. $\Psi^j$ represents the direct sum of orthogonal projections of $I(x,y)$ onto a detailed space at scale j spanned by $$\Psi_{k_1,k_2}^{j,\lambda}(x,y).$$

As discussed above, microcalcifications can be detected effectively by more heavily weighting a few low levels (scales around 2) in which microcalcifications are enhanced, and multiplying low weights at the other levels to suppress background structures and noise. For this purpose, we introduce a weight $w_j$ at each scale j in Eq. (1), which yields the following weighted wavelet transform:

$$I_w(x,y) = \sum_{j=1}^{L} w_j \Psi^j(x,y). \quad (4)$$

The image $I_w(x,y)$ is called a weighted wavelet reconstruction, because it is a reconstructed image from weighted wavelet coefficients.

It should be noted that a more general nonlinear function such as the hyperbola function or the hyperbolic tangent function can be used as a weighting function instead of the weights in the weighted wavelet reconstruction in Eq. (4). However, optimization of these nonlinear weighting functions may be numerically unstable and may result in a suboptimal solution, because they require a number of parameters to specify the shape of the function. On the other hand, optimization of weights is numerically stable and computationally inexpensive, because it contains only a single parameter at each scale to be adjusted.

In a previous study [11], wavelet transforms were combined with the CAD scheme [3,6] to increase sensitivity up to 95% while keeping a low false-positive detection rate of approximately 1.5 clusters per mammogram. In that study, digitized mammograms were first processed by a noise-reduction filter based on mathematical morphology for removal of small spikes [12]. These mammograms were then transformed using the wavelet transform. With its multiresolution capability, the wavelet transform can separate small objects such as microcalcifications from large background structures. It was found that scale 1 (the smallest scale) showed mainly the high-frequency noise included in the mammogram, whereas scales 2 and 3 enhanced microcalcifications effectively. Scales higher than 3 showed a large correlation with the non-uniform background.

Therefore, partially reconstructing mammograms from scales 2 and 3 can effectively enhance microcalcifications, a process called the partial reconstruction method. The microcalcification enhanced images were processed further by the existing procedures in the CAD scheme [3,6], including gray-level thresholding, feature extraction, and clustering tests for detection of clustered microcalcifications. Finally, clusters obtained by the partial reconstruction method were combined with the clusters reported by the difference-image technique through a logical OR operation to yield a final result of clustered microcalcifications.

In the partial reconstruction method, mammograms are reconstructed from the wavelet coefficients in scales 2 and 3, and the coefficients in the other scales are simply eliminated. However, wavelet coefficients in scale 1 may contain some very subtle microcalcifications, and the coefficients in scale 4 or higher may contain some relatively obvious microcalcifications. Therefore, known systems have not formed a substantially optimal combination of weights implementing a weighting function.

Other researchers have investigated the feasibility of utilizing wavelet transforms for enhancement and detection of microcalcifications. Lain et al.[13] performed a scale-dependent enhancement of various mammographic features, including microcalcifications, by selectively scaling and weighting the wavelet coefficients. Qain et al. [14] and Clarke et al. [15] segmented microcalcifications by cascading adaptive spatial filters to perform a tree-structured wavelet transform. Strickland et al. [16] used a bank of multiscale matched filters for detection of microcalcifications. However, modifications of the wavelet coefficients for enhancement of microcalcifications is still an area where improvement is needed.

SUMMARY OF THE INVENTION

Accordingly, it is an object of the present invention to provide a method for determining a set of weighting coefficients to be applied to a wavelet transform.

It is another object of the present invention to provide an optimization method that utilizes a supervised training technique in determining the set of weighting coefficients.

It is yet another object of the present invention to apply the set of weighting coefficients optimized via supervised training to a mammogram to identify disease indicators, such as microcalcifications.

These and other objects are accomplished by a method that optimizes a set of weighting coefficients to be applied to a wavelet transform to produce a weighted wavelet transform. The optimized weighting coefficients are determined by first creating a teacher image by determining true locations of abnormalities or disease indicators in an original input image, identifying a training-free zone around each abnormality identified, and assigning a value of 0 to pixels outside the training-free zone and a value of 1 to pixels having a maximum value in the training-free zone. The original input image is then decomposed and reconstructed based on a weighted wavelet transform to produce an output image. An error function is determined by comparing the output image with the teacher image, and a set of weights applied to the weighted wavelet transform is optimized based on the error function.

True locations of abnormalities are determined manually by an expert, and optimization of the weighted coefficients applied to the wavelet transform is performed by repeatedly altering the weighting coefficients and reconstructing the original input image or a set of original images based on the weighted wavelet transform to produce an output image until a minimum of the error function is achieved.

The present invention is described in terms of identifying disease indicators or abnormalities, however, the methods and processes described herein are equally applicable to other medical and non-medical uses. For example, identifying or locating known, unknown, artificial or naturally occurring indicators, variations, objects, substances, from any number of a variety of mediums, represented in digital images, including but not limited to biological tissue, the earth's crust, bodies of water, construction sites, archeological sites, atmospheric bodies, interplanetary and/or interstellar space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
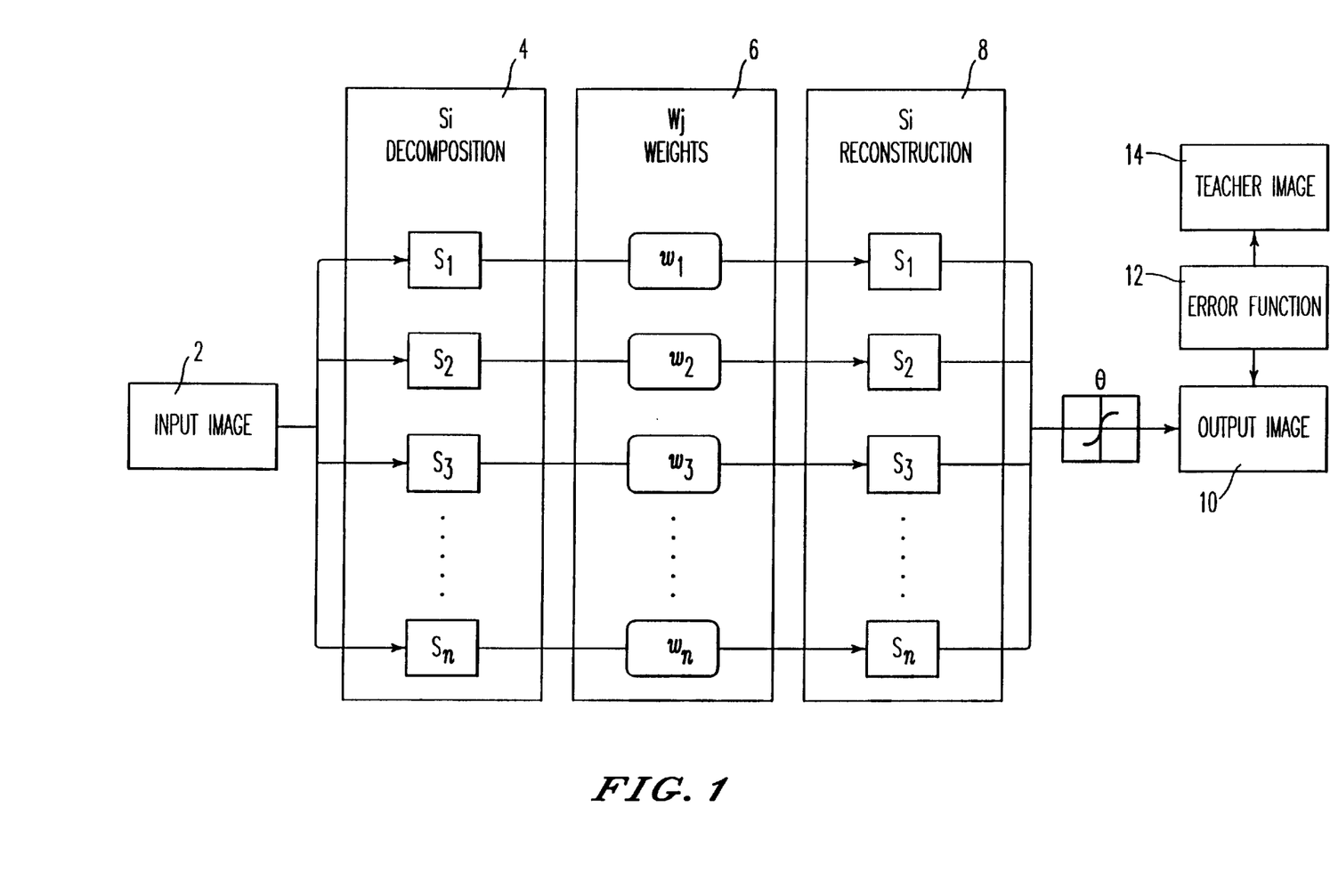
FIG. 1 is a block diagram of a supervised training system using a weighted wavelet transform.

Referring now to the drawings, wherein like reference numerals designate identical or corresponding parts throughout the several views, FIG. 1 is a block diagram illustrating a method of supervised training for the weighted wavelet transform described above. In FIG. 1, $w_j$ 6 is a weight at scale j as defined in Eq. (4), and $S_1$ 4 and 8 is a set of wavelet coefficients at scale j utilized for decomposition and reconstruction, respectively.

For normalization of pixel values of an output image to the range between 0 to 1, a pixelwise sigmoid function defined by $$\theta_{s,b}(V) = \frac{1}{1+\exp(-s(v-b))} \quad (5)$$

is applied to the weighted wavelet reconstruction $I_w$ in Eq. (4). In the sigmoid function of equation (5), v represents a pixel value of the weighted reconstruction, and s and b are the slope and the bias of the sigmoid function. A final output image 10 is given by $O(x,y)=\theta_{s,b}(I(x,y))$.

In order to obtain high performance in a computerized scheme for detection of clustered microcalcifications, the present invention utilizes reliable and flexible supervised training techniques [9] to find optimal weights at each scale of a wavelet transform utilized in reconstruction of a decomposed original input image. In this context, the present invention uses a training process that is supervised by "true" locations of microcalcifications provided by an expert mammographer. These "true" locations provide positive identification of microcalcifications for optimization of the weight set applied at each scale of the wavelet transform. The optimized weight set is also referred to as a weighting function or weighting coefficients.

Previous methods assume a particular characteristic of the microcalcifications in original mammograms. Therefore, the present invention is more robust in detecting microcalcifications and maximizes separation between "true" microcalcifications and false signals caused by normal background structures and noise.

In the supervised training method, a teacher image 14 is generated for each of at least one original input image. The teacher image 14 specifies a desired output of the weighted wavelet transform.

Figure 2A:
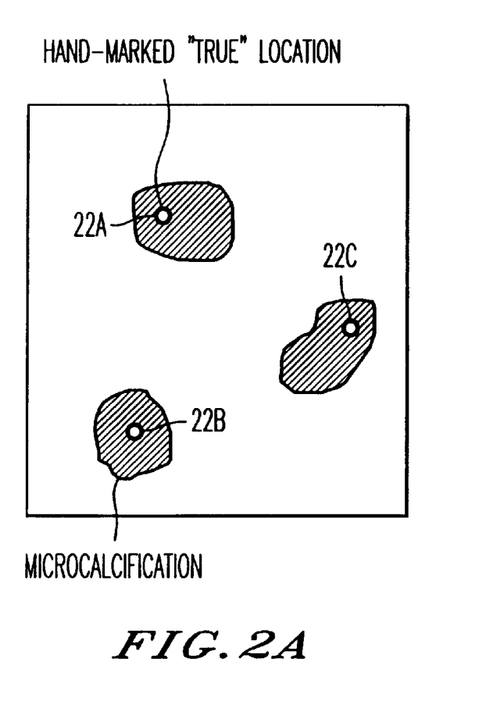
FIG. 2(A) is an illustration of microcalcifications identified and hand marked by an expert mammographer.
Figure 2B:
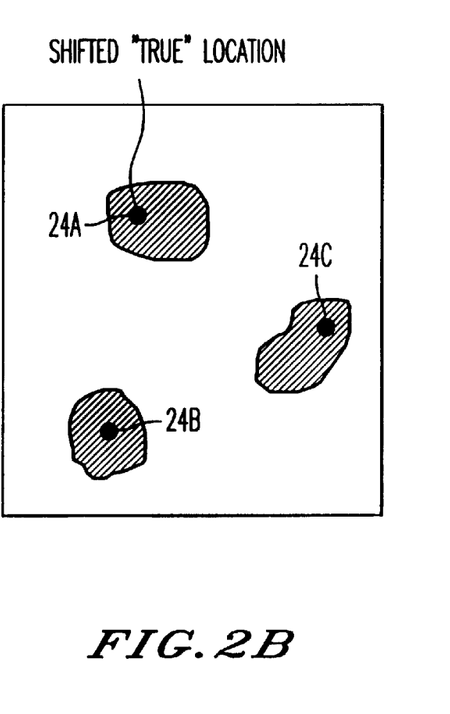
FIG. 2(B) is an illustration of a shifted "true" location of the microcalcifications identified in FIG. 2(A)
Figure 2C:
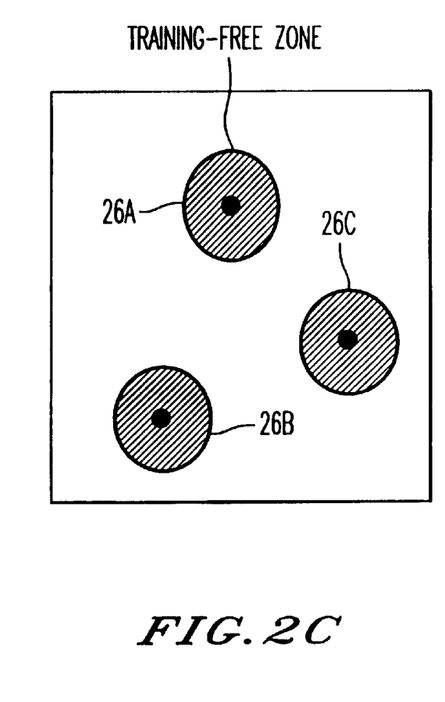
FIG. 2(C) is an illustration of a training-free zone around each identified microcalcification location.

FIGS. 2A–2C illustrate a method according to the present invention of constructing the teacher image 14 used in the training procedure. First, "true" locations of microcalcifications 22A, 22B, and 22C, provided by an expert mammographer, are marked as shown in FIG. 2(A). the "true" locations may be identified by X, Y coordinates, for example. Then each of these "true" locations is shifted to a corresponding shifted "true" location 24A, 24B, and 24C which are nearest respective intensity or grey-scale maxima in order to compensate for deviations caused by hand marking (FIG. 2(B)). Each respective maxima are located by searching an area around the "true" locations. The search area is, for example, a circular region having a radius of 5 pixels from a "true" location. If more than one maxima is identified in the search area, the first occurrence is utilized.

Other sized radii or alternative shapes may be utilized for the search area. The size of the search area is selected so as to encompass the entire abnormality to be identified. Therefore, in the case of microcalcifications, a radius of 5 pixels was selected as sufficient to encompass microcalcifications identified by the expert mammographer.

Finally, a small circular region is placed as a training-free zone [18] 26A, 26B, and 26C around each location of microcalcifications 22A, 22B, and 22C (FIG. 2(C)) based on the shifted "true" locations 24A, 24B, and 24C. Training-free zones are described further in [18].

The pixel values of the teacher image are assigned to 0 outside the training-free zones. The pixel value of the teacher image at a maximum point inside a training-free zone, as utilized in Equation (7) below, i.e., a point on which the output image O(x,y) from the weighted wavelet transform takes a maximum value, is assigned to +1. In other words, no specific values are assigned to the other pixels inside each training-free zone. Therefore, any training error will be calculated using the maximum point in each training-free zone, but excluding the other pixels in the training-free zones.

The method of using the training-free zone was proven effective in a previous study [18]. This is because if only the "true" locations were used, the corresponding truth image has large values in a small number of specific locations and a value of zero elsewhere; therefore, it is difficult to fine-tune the weighted wavelet transform to produce an output image that matches the truth image. Even though the fine tuning can be performed, the resulting set of weights for the weighted wavelet transform will be a very specific set of weights which produces an output image that perfectly matches the truth image. Such a set of weights may be too specific to the given truth image so that it may produce a poor result when it is applied to an unknown image. The training-free zone has an effect of avoiding this overtraining caused by fine tuning if only the "true" locations were used in the teacher images.

An error function is defined by comparing each output image with a corresponding teacher image for evaluation of training results. Let R denote a total number of images in a training set; $N_r$ denote a total number of training-free zones in the teacher image associated with the training image $r \in \{1, \ldots R\}$; and $T_i^r$, $i \in \{1 \ldots N_r\}$ denote the i-th training-free zone in the r-th image. Then, in terms of $E_{tfz}$, error identified in each training free zone, and $E_n$, error identified outside each training free Zone, an error function E for a reconstructed image can be written as:

$$E = E_{tfz} + kE_n, \quad (6)$$

$$E_{tfz} = \sum_{r=1}^{R} \sum_{i=1}^{N_r} \left(1 - \max_{(x,y) \in T_i^r} O_r(x, y)\right)^2, \quad (7)$$

$$E_n = \sum_{r=1}^{R} \sum_{(x,y) \notin \cup_{i=1}^{N_r} T_i^r} (O_r(x, y))^2, \quad (8)$$

$$k = \frac{\text{Total number of microcalcifications}}{\text{Total number of pixels outside the training-free zones}} \quad (9)$$

where $O_r(x,y)$ is a pixel value (normalized, 0–1 intensity) of the r-th output image at position (x,y), and $$\max_{(x,y) \in T_i^r} O_r(x, y) \quad (10)$$

is the maximum value of $O_r(x,y)$ in the training-free zone $T_i^r$, and k is a weighting factor which balances a number of pixels outside the training-free zones with a number of microcalcifications in the training-free zones.

Equations 6–10 are essentially a comparison of the reconstructed image to the teacher image. As seen in Equations 6–10, the error function E increases with increased error outside the training-free zones, and decreases with increased intensity of the maximum point inside each training free zone.

In addition to the above error function, one can use the following error function with an arbitrary integer n.

$$E = E_{tfz} + kE_n, \quad (11)$$

$$E_{tfz} = \sum_{r=1}^{R} \sum_{i=1}^{N_r} \left|1 - \max_{(x,y) \in T_i^r} O_r(x, y)\right|^n, \quad (12)$$

$$E_n = \sum_{r=1}^{R} \sum_{(x,y) \notin \cup_{i=1}^{N_r} T_i^r} |O_r(x, y)|^n. \quad (13)$$

However, because only one pixel is compared inside each training free zone and any number of pixels are compared outside each training free zone, disproportionate amount of error are compared. Therefore, the weighting factor k is important because it balances the number of pixels compared between the training-free zones and areas outside the training-free zones which also balances error accumulated therefrom. Without such balancing, the error function would, in most cases, be dominated by error outside the training-free zone.

The supervised training is designed to minimize the error function defined in Eqs. (6)–(9) by searching for the optimal values of weights $w_j$ as well as s and b in the sigmoid function. Therefore, an optimal weight set when applied to reconstruct an image would cause equation (7) to approach 1 for each Max $O_r(x,y)$ value (resulting in a lower $E_{tfz}$ value) and minimize the error outside the training free zones ($E_n$) as determined in equation (8).

In a preferred embodiment, Powell's conjugate gradient method [19] is used for the minimizing the error because it is an efficient algorithm for optimization and does not require explicit calculation of an error function gradient.

Powell's conjugate gradient method is implemented with the following algorithm. First, in the L dimensional "weight" space $W = \{w_j, 1 \leq j \leq L\}$, we set an initial starting point $P_0$ and search direction $u_i$ as follows:

$$P_0 = (1, \ldots, 1, \ldots, 1) \quad (14)$$

$$u_j = (1, \ldots, j, \ldots, L) 1 \leq j \leq L \quad (15)$$

Then, repeat the following sequence of steps until the value of the error function falls in a specified error tolerance.

(a) Save $P_0$ (b) For j=n 1, . . . , L, move $P_{j-1}$ to the minimum along direction $u_j$ and identify the minimum point as $P_j$.

(c) For j=1, . . . , L−1, replace $u_j$ by $u_{j+1}$.

(d) Replace $u_L$ by $P_{L-P0}$.

(e) Move $P_N$ to the minimum along direction $u_L$ and identify this point as $P_0$.

(f) Go to (a).

Other numerical methods such as simplex method, simulated annealing, and genetic algorithms may also be used for minimization of the cost function.

For comparison purposes, the supervised training method of the present invention was tested by employing a test database including 39 screen-film mammogram cases which were obtained with a conventional screen-film (Kodak Min R/OM) system. These cases were chosen over a period of three years by experienced mammographers as being representative of subtle clustered microcalcifications. All mammograms were digitized to a pixel size of 0.1×0.1 mm$^2$ by use of a Fuji drum scanner system, such as is disclosed in a previous study [3]. The optical density in the range from 0.2 to 2.75 was linearly quantized to 10-bit gray scales. Other digitization or scanning methods, quantization methods, pixel sizes, and densities may also be utilized.

In these 39 mammograms, the total number of clusters of microcalcifications was 41. There were, on average, 14.3 microcalcifications per cluster, with a standard deviation of 12.0. An average size of the microcalcifications was 8.8 pixels in area, with a standard deviation of 7.8. An average contrast of the microcalcifications (measured as a difference in film optical density between a microcalcification and its background) was 0.11, with a standard deviation of 0.04. An average diameter of the microcalcifications was 0.3 mm, with a standard deviation of 0.12.

The "true" locations of the microcalcifications for all mammograms in the test database were initially determined visually from the mammograms by an experienced mammographer. A true cluster of microcalcifications is defined as a cluster that contains visually identifiable microcalcifications, and a false cluster is one that contains no such microcalcifications.

A total of 55 "abnormal" regions of interest (ROIs) containing true microcalcifications were extracted visually from the above test database. Each ROI was 128×128 pixels (12.8×12.8 mm$^2$)in size. Some larger clusters (7 of 41) were divided into several ROIs, so that a central square region with 64×64 pixels contained at least three microcalcifications. Only the central region was used for supervised training because a wavelet transform edge effect might distort microcalcifications located at a boundary region of an ROI.

These "abnormal" ROIs were rotated by 45 and 90 degrees to avoid orientation dependency in supervised training, for a total of 165 ROIs. In a similar manner, 44 "normal" ROIs were selected randomly from normal areas of the mammograms and were then rotated to yield a total of 132 normal ROIs.

These 297 ROIs were used for optimization of the weights in the weighted wavelet transform. A jackknife test was utilized in testing the supervised training method, namely, one half of the ROIs were selected randomly from the ROIs as a training set for the weights, and the other half were used as a testing set for evaluation of the weighted wavelet transform. The jackknife test was repeated 20 times by random partitioning of the set of ROIs for training and testing.

A receiver operating characteristic (ROC) analysis was performed for evaluation of performance concerning a degree of enhancement of "true" microcalcifications, a degree of suppression of structures other than microcalcifications, as well as clustering capability.

In the following, "detected microcalcifications" at a certain gray-level threshold value are defined as isolated islands in an output ROI after binarization by thresholding and labeling by four-connectivity region growing. (See U.S. Pat. No. 5,133,020). An ROI in the set of normal ROIs is considered to be a positive ROI (an ROI with clustered microcalcifications) if the number of detected microcalcifications in the output image is equal to or greater than a predetermined threshold known as a cluster criterion. In the test, the threshold was set as three detected microcalcifications in the output image. An ROI in the set of abnormal ROIs is considered to be positive if, in addition to the above cluster criterion, the detected microcalcifications are located within four pixels from the true positions where actual microcalcifications are located. This technique was shown to be efficient when comparing performance among different methods for detection of clustered microcalcifications based on a set of ROIs. [18]

For each ROI in a testing set, the threshold value was lowered until the ROI was identified as positive. Then an average pixel value of the detected microcalcifications was calculated. The average values for all of the ROIs in the testing set was subjected to the LABROC4 program developed by Metz et al. [20] to generate an ROC curve for the testing set. If the optimally weighted wavelet transform effectively enhances the true microcalcifications in a cluster and suppresses background structures and noise, then the average pixel value of an abnormal ROI becomes high whereas that of a normal ROI is low, thus yielding an area under the ROC curve ($A_Z$) which is high. On the other hand, if the method enhances both microcalcifications and background structures, then the average pixel value becomes high for both normal and abnormal ROIs, yielding a low $A_Z$ value. Therefore, $A_z$ is utilized instead of the value of the error function defined in Eq. (6)–(9), to monitor performance of the optimally weighted wavelet transform.

In a preferred embodiment of the present invention, the 8-tap Least Asymmetric Daubechies' wavelet [17] (also known as Symmlet) is used as the mother wavelet, because it was shown to be effective in detecting microcalcifications. [11] Other types of wavelets such as Haar, Daubechies, Coifman, Beylkin, Symmlet, Vaidyanathan, Mayer, Shannon, Battle-Lemarie, biorthogonal wavelets as well as multiwavelets can be used for the same purpose. Using the Asymmetric Daubechies wavelet during testing, weights from scales 1 to 5 were iteratively optimized in supervised training, whereas wavelet coefficients corresponding to other scales were eliminated, and an iteration was terminated when the $A_z$ value for the testing set reached a maximum. [18].

Figure 3A:
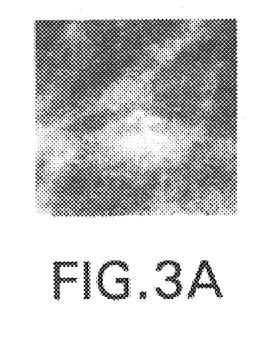
FIG. 3(A) is a photograph/illustration of an original region-of-interest (ROI) containing clustered microcalcifications.
Figure 3B:
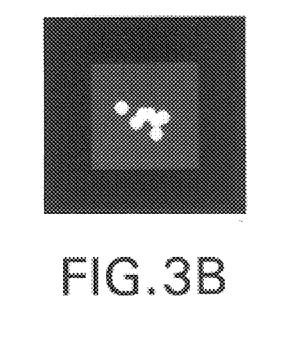
FIG. 3(B) is a photograph/illustration of a teacher image generated from the original ROI of FIG. 3(A)

FIG. 3(A) shows an original ROI image containing clustered microcalcifications at a center portion of the image. FIG. 3(B) shows a teacher image generated from the original ROI image. The training-free zones are indicated by white circles.

Figure 3C:
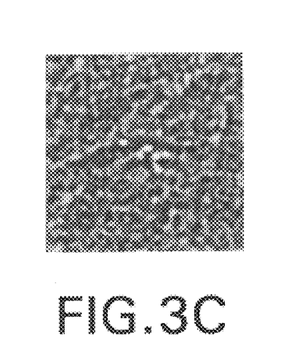
FIG. 3(C) is a photograph/illustration of an image generated from the original ROI of FIG. 3(A) using a difference image technique.
Figure 3D:
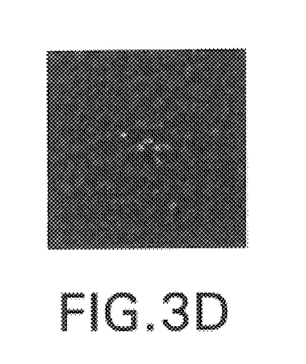
FIG. 3(D) is a photograph/illustration of an image generated from the original ROI of FIG. 3(A) using a partial reconstruction method with scales 2 and 3.
Figure 3E:
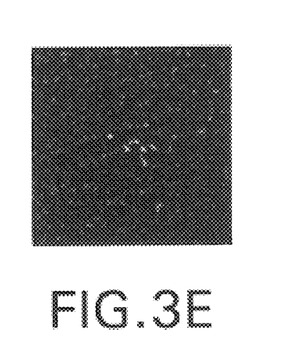
FIG. 3(E) is a photograph/illustration of an output image generated from the original ROI of FIG. 3(A) utilizing the optimally weighted wavelet transform of the present invention.

In FIGS. 3(C)–3(E) are examples of microcalcifications enhanced by different methods. FIGS. 3(C), 3(D), and 3(E) illustrate the output images by a difference-image technique, a partial reconstruction method with scales 2 and 3, and an optimally weighted wavelet transform according to the present invention, respectively. Although the difference-image technique enhances microcalcifications, some background structures remain. The partial reconstruction method can remove most of the background; however, subtle, low-contrast microcalcifications are degraded.

As shown in FIG. 3(E), the optimally weighted wavelet transform effectively suppresses background structures while maintaining details of the shape of individual microcalcifications. Moreover, two closely located microcalcifications are well separated in the output image by the optimally weighted wavelet transform, compared to separation resulting from the difference-image technique (shown in FIG. 3(C)).

Figure 4:
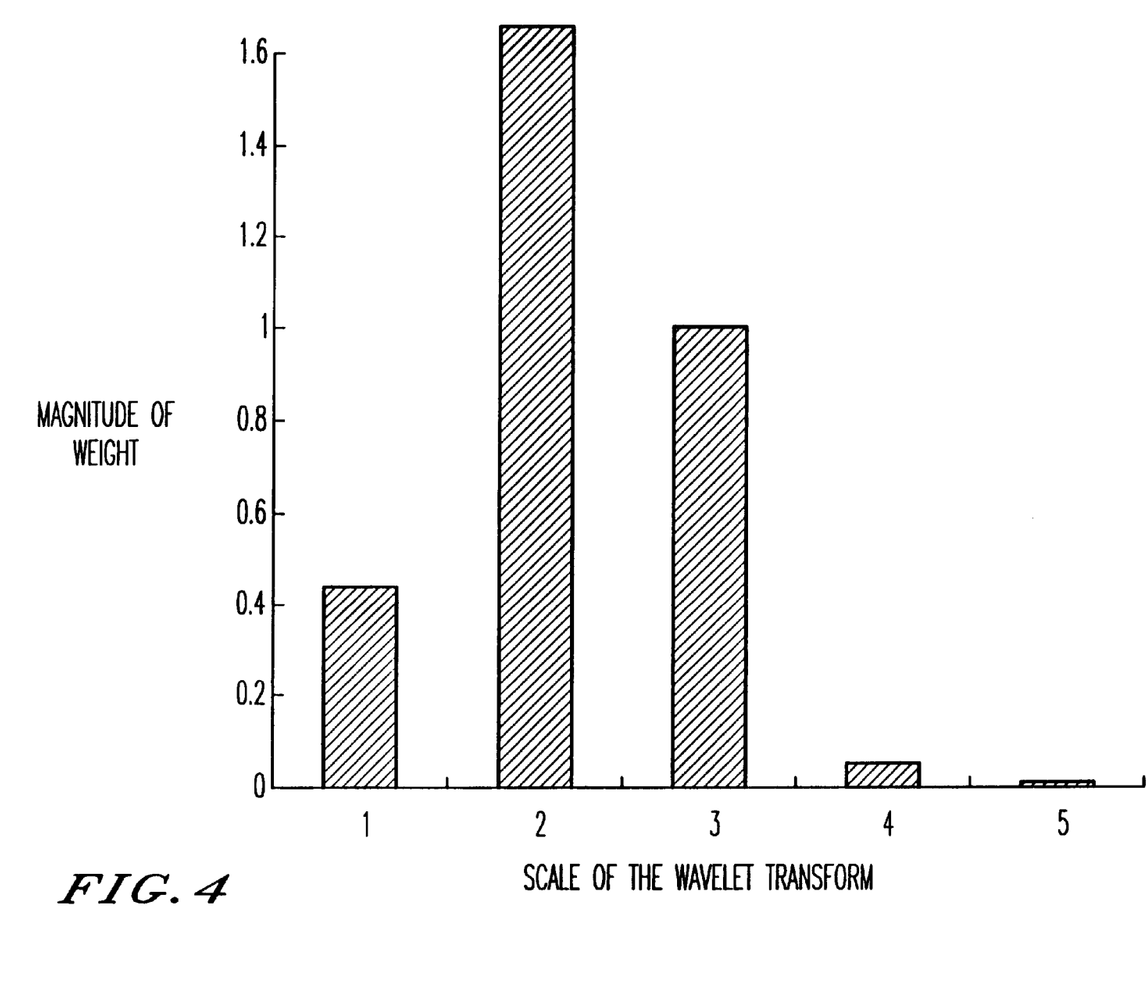
FIG. 4 is an illustration of the optimal weights versus scale obtained by supervised training.

FIG. 4 is a graph illustrating optimal weights obtained with supervised training. The weights were calculated by averaging optimal weights obtained from the training sets in individual partitions of the jackknife test. The optimal weights indicate that scales 2 and 3 have large weights, whereas some other scales have small, but non-zero weights.

Figure 5:
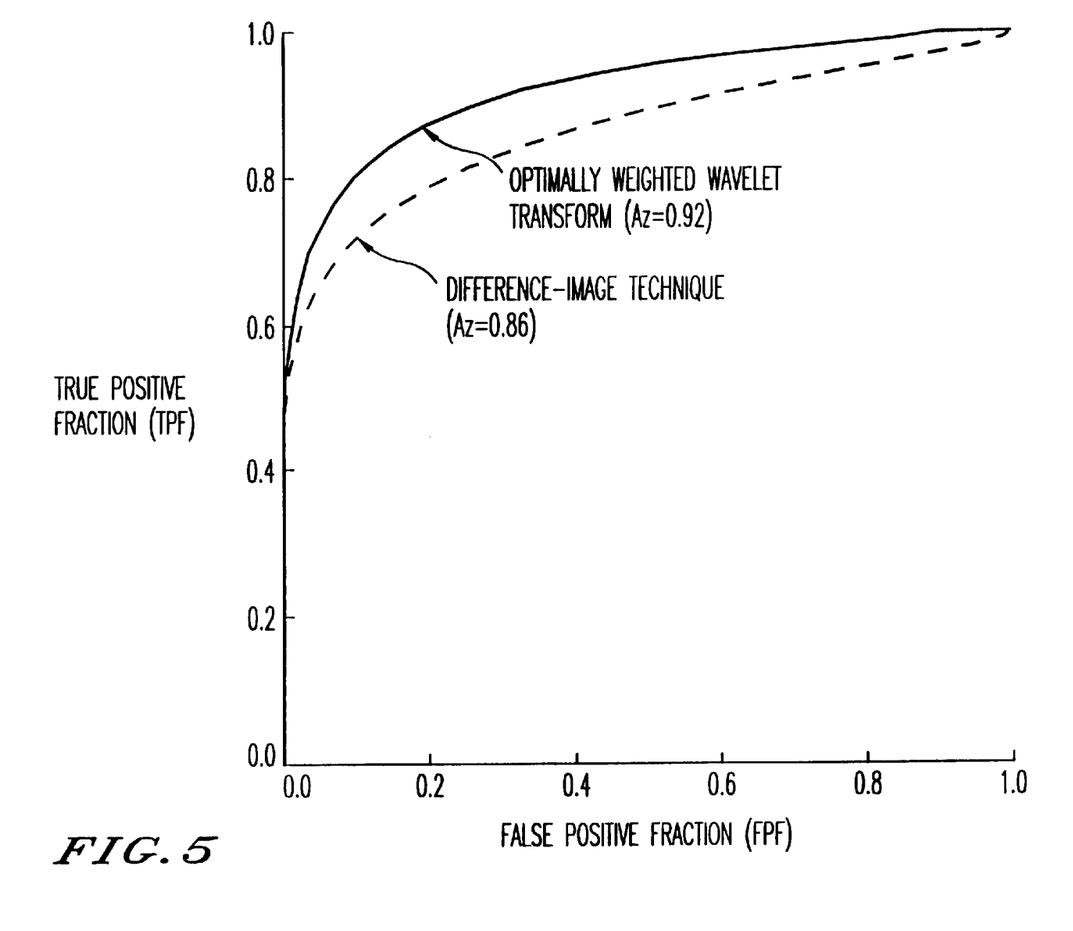
FIG. 5 is a graph illustrating a comparison of receiver operating characteristics (ROC) obtained by the optimally weighted wavelet transform and the difference image technique.

In FIG. 5, a comparison of ROC curves obtained by the optimally weighted wavelet transform and the difference-image technique is shown. (See U.S. Pat. No. 4,907,156). The ROC curve for the optimally weighted wavelet transform was generated by averaging ROC curves obtained from the testing sets at individual partitions of the jackknife test. The $A_z$ values were 0.92 for the optimally weighted wavelets and 0.86 for the difference-image technique. Results of a univariate z-sore test [21] showed that a difference of the $A_z$ values for each partition of the jackknife test was statistically significant (P value<0.01). At a specificity of 80%, the optimized wavelets showed a sensitivity of 87%, whereas the difference-image technique gave a sensitivity of 79%.

Figure 6:
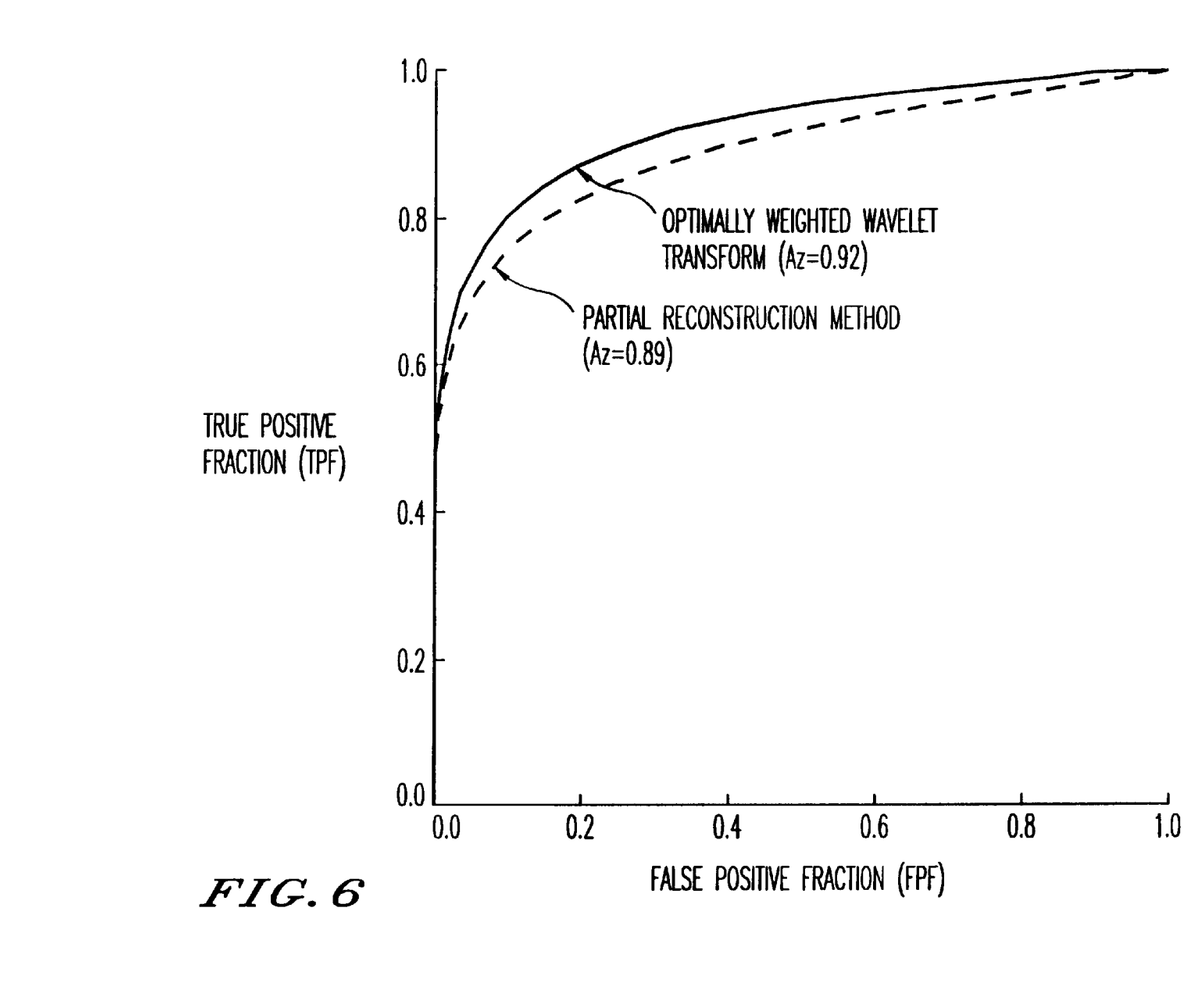
FIG. 6 is a graph illustrating a comparison of ROC curves obtained with the optimally weighted wavelet transform and a partial reconstruction method with scales 2 and 3.

FIG. 6 shows a comparison of ROC curves obtained with the optimally weighted wavelet transform and the partial reconstruction method with scales 2 and 3. The same mother wavelet as that of the optimally weighted wavelet transform was used in the partial reconstruction method. The $A_z$ value for the partial reconstruction method was 0.89. The P value for each partition of the jackknife test was less than 0.01, which showed that the difference in $A_z$ values between the two methods was also statistically significant. At a point on the ROC curve, the partial reconstruction method showed a sensitivity of 83% with a specificity of 80%.

The optimized weights used in FIG. 4 indicate that, according to the supervised training procedure, scales 2 and 3 are the most important in enhancement and detection of microcalcifications in the mammographic database.

In the present invention, it has also been determined that scale 1 needs to be weighted by a small amount rather than being completely eliminated. This is because the wavelet coefficients in scale 1 may contain information about very subtle microcalcifications, which can be enhanced by use of this scale 1. The magnitude of weight for scale 1 was approximately one quarter of the weight for scale 2. Too large a weight for scale 1 may amplify noise in a reconstructed image, which may cause false detections.

The supervised learning method of the present invention automatically adjusts the weight at scale 1 to an appropriate value in which very subtle microcalcifications are enhanced while most high-frequency noise is suppressed. A weight for scale 3 was adjusted to be somewhat less than the weight for scale 2, in order to suppress background structures that were similar in scale to relatively obvious microcalcifications. Weights for scales higher than scale 3 were almost zero, which eliminated large-scale background structures. This balanced combination of weights at various scales provides superior performance for the optimally weighted wavelet transform compared to the other methods, as demonstrated in FIGS. 5 and 6.

For example, experimental results indicate that the optimally weighted wavelet transform can substantially outperform the difference-image technique used in other existing CAD schemes, as well as outperform the partial reconstruction method which is widely used for enhancement of microcalcifications on mammograms.

Therefore, the present invention provides a new method of optimally weighting a wavelet transform based on supervised training for efficient enhancement and detection of microcalcifications. The weights are optimized by minimization of an error function that represents the difference between the teacher images and the images reconstructed from weighted wavelet coefficients. The optimally weighted wavelet transform can effectively enhance true microcalcifications and suppress false signals due to background structures and noise in mammograms. The optimized wavelet transform is, therefore, a useful method for detection of clustered micro-calcifications.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Figure 7:
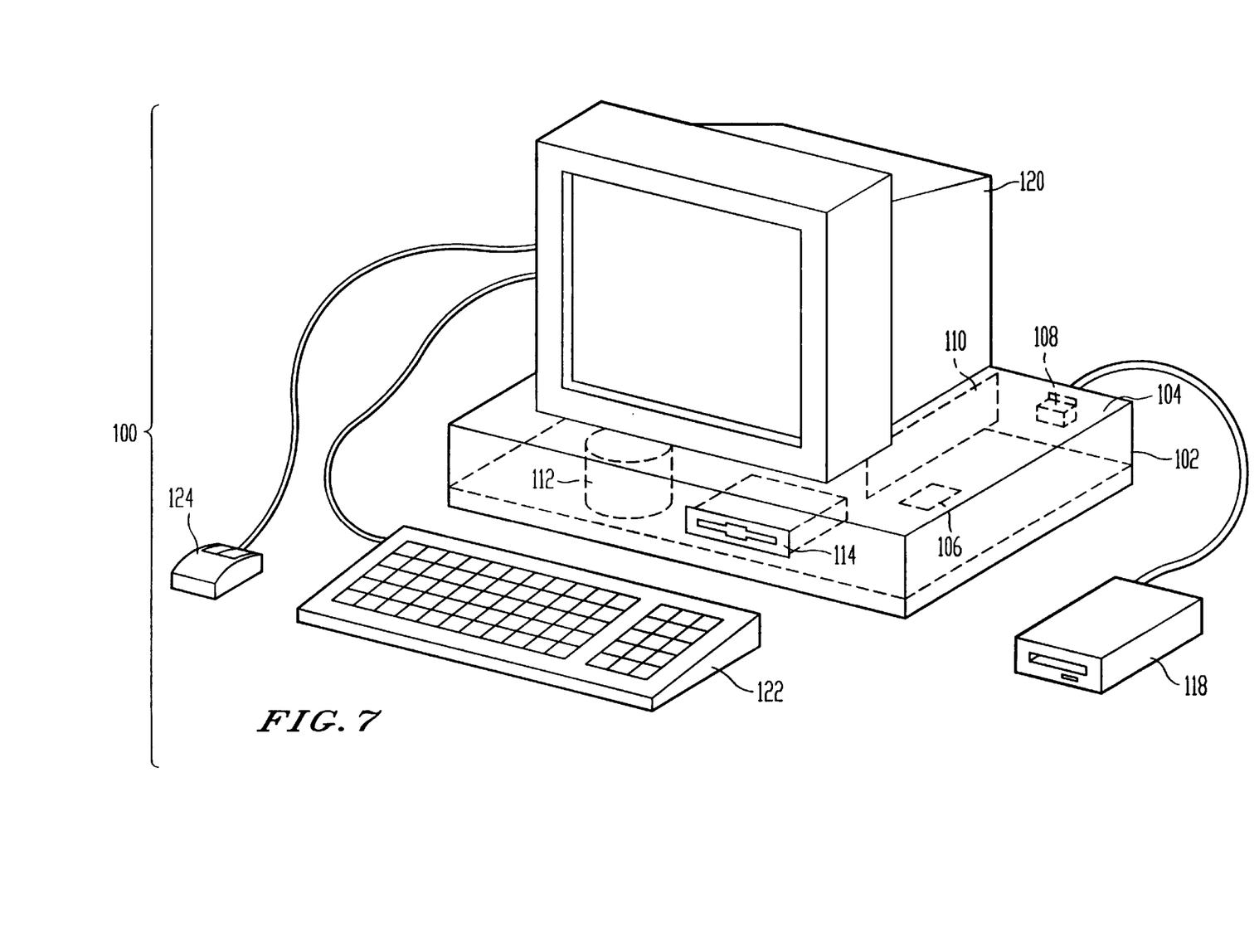
FIG. 7 is a schematic illustration of a general purpose computer system programmed according to the teachings of the present invention.

FIG. 7 is a schematic illustration of a general purpose computer 100 programmed according to the teachings of the present invention. The general purpose computer 100 includes a computer housing 102 having a motherboard 104 which contains a CPU 106 and memory 108. The computer 100 also includes plural input devices, e.g., a keyboard 122 and mouse 124, and a display card 110 for controlling monitor 120, In addition, the computer system 100 further includes a floppy disk drive 114 and other removable media devices (e.g., tape, and removable magneto-optical media (not shown)), a hard disk 112, or other fixed, high density media drives, connected using an appropriate device bus, e.g., a SCSI bus or an Enhanced IDE bus. Also connected to the same device bus or another device bus, the computer 100 may additionally include a compact disc reader/writer 118 or a compact disc jukebox (not shown).

Stored on any one of the above described storage medium (computer readable media), the present invention includes programming for controlling both the hardware of the computer 100 and for enabling the computer 100 to interact with a human user. Such programming may include, but is not limited to, software for implementation of device drivers, operating systems, and user applications. Such computer readable media further includes programming or software instructions to direct the general purpose computer 100 to perform tasks in accordance with the present invention.

The programming of general purpose computer 100 includes, but is not limited to, software modules for manipulation of digital images including identification of regions of interest, identification and storage of images and pixel values, implementing wavelet transform decomposition and reconstruction of images, altering and applying weighting functions to wavelet transforms, image comparisons, error functions and evaluations, numerical analysis, and storage and display of results. Utilizing the above software modules, the programming of general purpose computer 100 also includes high level software modules that direct determination of a substantially optimal set of weights to be applied to a wavelet transform, and reconstruct images based on a weighted wavelet transform to identify abnormalities.

Obviously, numerous modifications and variations of the present invention are possible in light of the above teachings. It is therefore to be understood that within the scope of the appended claims, the invention may be practiced otherwise than as specifically described herein.

APPENDIX

[1] R. G. Bird, T. W. Wallace, and B. C. Yankaskas. Analysis of cancers missed at screening mammography. *Radiology*, 184:613–617, 1992.

[2] H. Burhenne, L. Burhenne, F. Goldberg, T. Histop, A. J. Worth, P. M. Rebbeck, and L. Kan. Interval breast cancers in the screening mammography program of British Columbia: Analysis and classification, American Journal of Roentgenology, (AJR), 162:1067–1071, 1994.

[3] H.-P. Chan, K. Doi, G. S, C. J. Vyborny, H. MacMahon, and P. M. Jokich. Image feature analysis and computer-aided diagnosis in digital radiography. 1. Automated detection of microcalcifications in mammography. *Medical Physics*, 14:538–548, 1987.

[4] H.-P. Chan, K. Doi, C. J. Vyborny, R. A. Schmidt, C. E. Metz, K. L. Lam, T. Ogura, Y. Wu, and H. MacMahon. Improvement in radiologists' detection of clustered microcalcifications on mammograms: The potential of computer-aided diagnosis. *Investigative Radiology*, 25:1102–1110, 1990.

[5] R. M. Nishikawa, Y. Jiang, M. L. Giger, R. A. Schmidt, C. J. Vyborny, W. Zhang, J. Papaioannou, U. Bick, R. Nagel, and K. Doi. Performance of automated CAD schemes for the detection and classification of clustered microcalcifications. In A. Gale, S. Astley, D. Dance, and A. Cairns, editors, Digital Mammography, pages 13–20. Amsterdam, Elsevier Science, 1994.

[6] R. M. Nishikawa, M. L. Giger, K. Doi, C. J. Vyborny, and R. A. Schmidt. Computer-aided detection of clustered microcalcifications on digital mammograms. *Medical and Biological Engineering and Computing,* 33:174–178, 1995.

[7] B. Lo, H.-P. Chan, J. Lin, M. Freedman, and S. Mun. Artificial convolution neural network for medical image pattern recognition. *Neural Networks,* 8:1201–1214, 1995.

[8] Y. Wu, K. Doi, M. L. Giger, and R. M. Nishikawa. Computerized detection of clustered microcalcifications in digital mammograms: Applications of artificial neural networks. *Medical Physics,* 19:555–560, 1992.

[9] W. Zhang, K. Doi, M. L. Giger, Y. Wu, R. M. Nishikawa, and R. A. Schmidt. Computerized detection of clustered microcalcifications in digital mammograms using a shift-invariant artificial neural network. *Medical Physics,* 21:517–524, 1994.

[10] N. Karssemeijer. A stochastic method for automated detection of microcalcifications in digital mammograms. *Information Processing in Medical Imaging,* Springer-Verlag, New York, 76:221–238, 1991.

[11] H. Yoshida, K. Doi, R. M. Nishikawa, M. L. Giger, and R. A. Schmidt. An improved computer-assisted diagnosis scheme using wavelet transform for detection of clustered microcalcifications in digital mammograms. *Academic Radiology,* 3:621–627, 1996.

[12] R. M. Nishikawa, M. L. Giger, and K. Doi. An edge preserving, noise reduction filter for digital mammography. *Med Phys,* 1996 (to be submitted). (See also U.S. Pat. No. 5,666,434).

[13] A. Laine, S. Schuler, J. Fan, and W. Huda. Mammographic feature enhancement by multiscale analysis. *IEEE Transactions on Medical Imaging,* 13:1–28, 1994.

[14] W. Qian, M. Kallergi, and L. P. Clark et al. Tree structured wavelet transform segmentation of microcalcifications in digital mammography. *Med Phys,* 22:1247–1254. 1995.

[15] L. P. Clarke, M. Kallergi, W. Qian, H. D. Li, R. A. Clark, and M. L. Silbiger. Tree-structured nonlinear filter and wavelet transform for microcalcification segmentation in digital mammography. *Cancer Letters,* 77:173–181, 1994.

[16] R. N. Strickland and H. I. Hahn. Wavelet transform for detecting microcalcifications in mammograms. *IEEE Trans. on Medical Imaging,* 15:218–229, 1996.

[17] I. Daubechies. *Ten Lectures on Wavelets.* Society for Industrial and Applied Mathematics (SIAM), Philadelphia, Pa., 1992.

[18] W. Zhang, K. Doi, M. L. Giger, R. M. Nishikawa, and R. A. Schmidt. An improved shift-invariant artificial neural network for computerized detection of clustered microcalcifications in digital mammograms. *Medical Physics,* 23:595–601, 1996.

[19] W. H. Press, S. A. Teukolsky, W. T. Vetterling, and B. P. Flannery. *Numerical recipes in C (2nd Ed.).* Cambridge University Press, 1992.

[20] C. E. Metz. Some practical issues of experimental design and data analysis in radiological ROC studies. *Invest Radiol,* 24:234–245, 1989.

[21] Narayan C. Giri, Multivariate Statistical Analyses, Marcel Dekker, Inc., 1995.

What is claimed as new and desired to be secured by Letters Patent of the United States is:

1. In a method for determining wavelet scale weighting coefficients, the improvement comprising:

performing supervised training, including wavelet transformation, iterative inverse wavelet transformation and error analysis, on at least one training image derived from sampled radiation to determine three or more non-zero wavelet scale weighting coefficients, comprising,
   generating a teacher image based on a respective training image derived from sampled radiation, including identifying in said teacher image true locations of indicia in said respective training image, and defining a training-free zone around each of the identified true locations of said indicia in said teacher image; and selecting said three or more non-zero wavelet scale weighting coefficients based on iterative inverse wavelet transformation and error analysis performed in relation to each said training-free zone defined in said teacher image;

wherein said step of selecting said three or more non-zero wavelet scale weighting coefficients includes the substeps of
   a) selecting first candidate weighting coefficients,
   b) generating a reconstructed training image based on the first candidate wavelet scale weighting coefficients and said respective training image,
   c) determining a first error using said reconstructed image and said respective teacher image,
   d) selecting second candidate weighting coefficients based on the first error and repeating steps b) and c) for the second candidate weighting coefficients until the error determined in step c) is within a specified error condition; and wherein said substep of determining a first error includes the steps of:
   determining a first error component based on a respective maximum value in each training-free zone in said at least one reconstructed image,
   determining a second error component based on differences between intensity values of said respective teaching image and said reconstructed training image outside the training-free zones,
   determining a ratio between a total number of said indicia identified and a number of pixels in the reconstructed training image outside the training-free zones,
   providing a balanced error by multiplying said ratio to the second error component, and
   calculating a total error in said at least one reconstructed image by combining the balanced error and the first error component.

2. The method according to claim 1, further comprising:

filtering an original image by applying a wavelet transformation decomposing said original image; and reconstructing the decomposed original image by a weighted inverse wavelet transformation, utilizing said three or more non-zero wavelet scale weighting coefficients, applied to the decomposed original image.

3. The method according to claim 2, wherein said filtering step comprises:

decomposing the original image by means of a wavelet transformation into plural wavelet scales; and reconstructing the decomposed original image, including,
applying said three or more non-zero wavelet scale weighting coefficients to respective of the plural wavelet scales of the decomposed original image, and
performing a weighted inverse wavelet transformation utilizing the plural wavelet scales of the decomposed original image.

4. The method according to claim 1, wherein said substep of selecting second candidate weighting coefficients includes the step of:
applying Powell's conjugate gradient to said first error and said first candidate weighting coefficients to determine said second candidate weighting coefficients.

5. A computer readable medium on which is stored instructions that cause a computer system to determine wavelet scale weighting coefficients, by performing the step of:
performing supervised training, including wavelet transformation, iterative inverse wavelet transformation and error analysis, on at least one training image derived from sampled radiation to determine three or more non-zero wavelet scale weighting coefficients, comprising,
generating a teacher image based on a respective training image derived from sampled radiation, including identifying in said teacher image true locations of indicia in said respective training image,
defining a training-free zone around each of the identified true locations of said indicia in said teacher image, and
selecting said three or more non-zero wavelet scale weighting coefficients based on iterative inverse wavelet transformation and error analysis performed in relation to each said training-free zone defined in said teacher image;
wherein said step of selecting said three or more non-zero wavelet scale weighting coefficients includes the substeps of,
a) selecting first candidate weighting coefficients,
b) generating a reconstructed training image based on the first candidate wavelet scale weighting coefficients and said respective training image,
c) determining a first error using said reconstructed image and said respective teacher image,
d) selecting second candidate weighting coefficients based on the first error and repeating steps b) and c) for the second candidate weighting coefficients until the error determined in step c) is within a specified error condition; and
wherein said substep of determining a first error includes the steps of:
determining a first error component based on a respective maximum value in each training-free zone in said at least one reconstructed image,
determining a second error component based on differences between intensity values of said respective teaching image and said reconstructed training image outside the training-free zones,
determining a ratio between a total number of said indicia identified and a number of pixels in the reconstructed training image outside the training-free zones,
providing a balanced error by multiplying said ratio to the second error component, and
calculating a total error in said at least one reconstructed image by combining the balanced error and the first error component.

6. The computer readable medium of claim 5, wherein the stored instructions further perform the steps of:
filtering an original image by applying a wavelet transformation decomposing said original image; and
reconstructing the decomposed original image by a weighted inverse wavelet transformation, utilizing said three or more non-zero wavelet scale weighting coefficients, applied to the decomposed original image.

7. The computer readable medium of claim 6, wherein said step of filtering includes the steps of:
decomposing the original image by means of a wavelet transformation into plural wavelet scales; and
reconstructing the decomposed original image, including,
applying said three or more non-zero wavelet scale weighting coefficients to respective of the plural wavelet scales of the decomposed original image, and
performing a weighted inverse wavelet transformation utilizing the plural wavelet scales of the decomposed original image.

8. The computer readable medium of claim 5, wherein the stored instructions for said substep of selecting second candidate weighting coefficients includes the step of:
applying Powell's conjugate gradient to said first error and said first candidate weighting coefficients to determine said second candidate weighting coefficients.

9. In an apparatus for determining wavelet scale weighting coefficients, the improvement comprising:
means for performing supervised training, including wavelet transformation, iterative inverse wavelet transformation and error analysis, on at least one training image derived from sampled radiation to determine three or more non-zero wavelet scale weighting coefficients, comprising,
means for generating a teacher image based on a respective training image derived from sampled radiation, including
means for identifying in said teacher image true locations of indicia in said respective training image, and
means for defining a training-free zone around each of the identified true locations of said indicia in said teacher image; and
means for selecting said three or more non-zero wavelet scale weighting coefficients based on iterative inverse wavelet transformation and error analysis performed in relation to each said training-free zone defined in said teacher image;
wherein said means for selecting said three or more non-zero wavelet scale weighting coefficients comprises,
a) means for selecting first candidate weighting coefficients,
b) means for generating a reconstructed training image based on the first candidate wavelet scale weighting coefficients and said respective training image,
c) means for determining a first error using said reconstructed image and said respective teacher image, and
d) means for selecting second candidate weighting coefficients based on the first error and repeating use of said b) means for generating and said c) means for determining, for the second candidate weighting coefficients, until the error determined by said c) means for determining is within a specified error condition; and wherein said means for determining a first error comprises, means for determining a first error component based on a respective maximum value in each training-free zone in said at least one reconstructed image, means for determining a second error component based on differences between intensity values of said at least one teaching image and said at least one reconstructed training image outside the training-free zones, means for determining a ratio between a total number of said indicia identified and a number of pixels in the reconstructed training image outside the training-free zones, means for providing a balanced error by multiplying said ratio to the second error component, and means for calculating a total error in said at least one reconstructed image by combining the balanced error and the first error component.

10. The improvement according to claim 9, wherein said means for filtering comprises:

means for applying a wavelet transformation decomposing said original image; and means for reconstructing the decomposed original image by a weighted inverse wavelet transformation, utilizing said three or more non-zero wavelet scale weighting coefficients, applied to the decomposed original image.

11. The improvement of claim 10, wherein said means for filtering comprises:

means for decomposing the original image by means of a wavelet transformation into plural wavelet scales; and means for reconstructing the decomposed original image, including, means for applying said three or more non-zero wavelet scale weighting coefficients to respective of the plural wavelet scales of the decomposed original image, and means for performing a weighted inverse wavelet transformation utilizing the plural wavelet scales of the decomposed original image.

12. The improvement according to claim 9, wherein said means for selecting second candidate comprises:

means for applying Powell's conjugate gradient to said first error and said first candidate weighting coefficients to determine said second candidate weighting coefficients.

* * * * *